March 4, 1924.
E. N. FALES
FOLDING CHASSIS FOR AIRCRAFT
Filed March 9, 1922    5 Sheets-Sheet 1
1,485,779
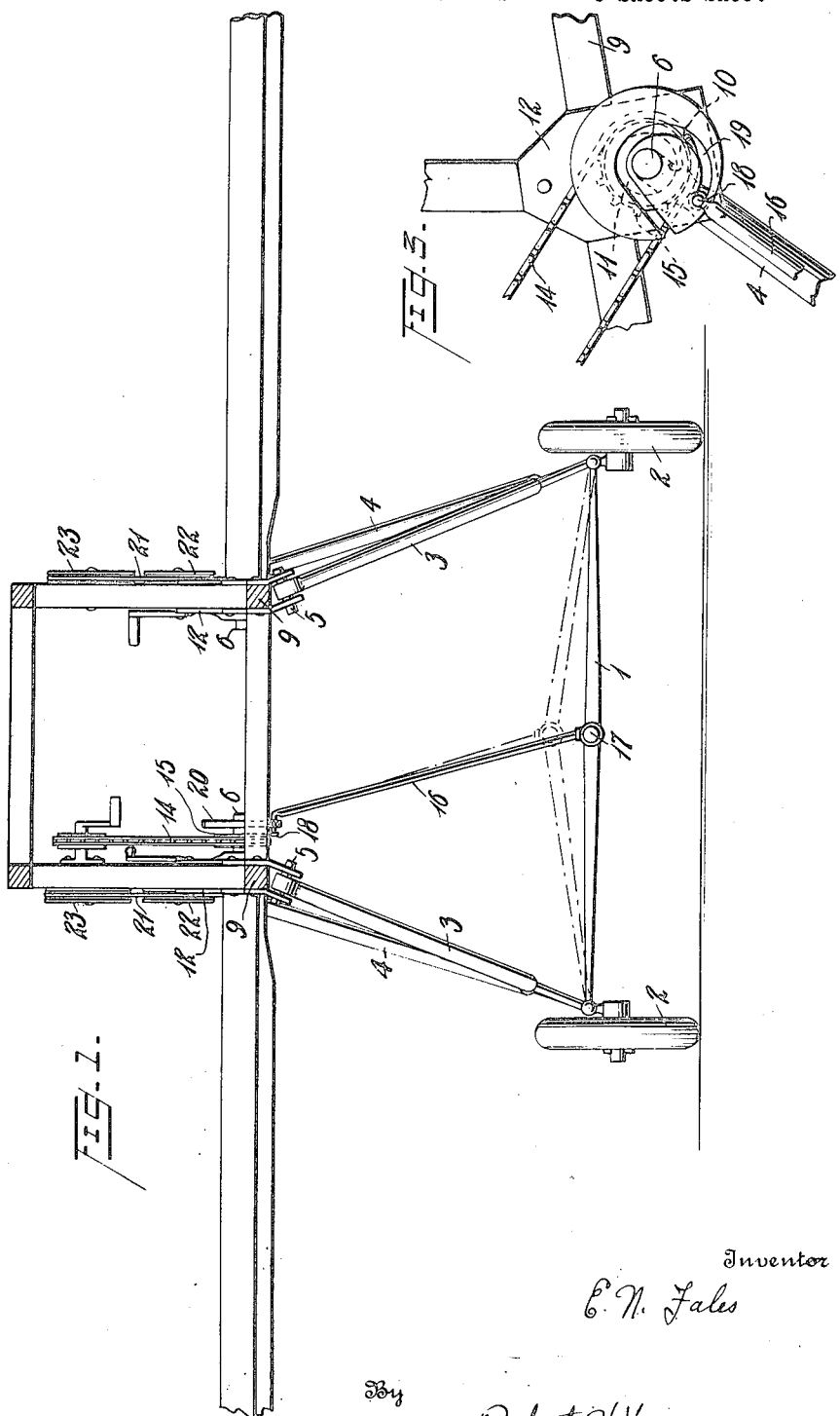
Inventor
E. N. Fales
By Robert H. Young    Attorney

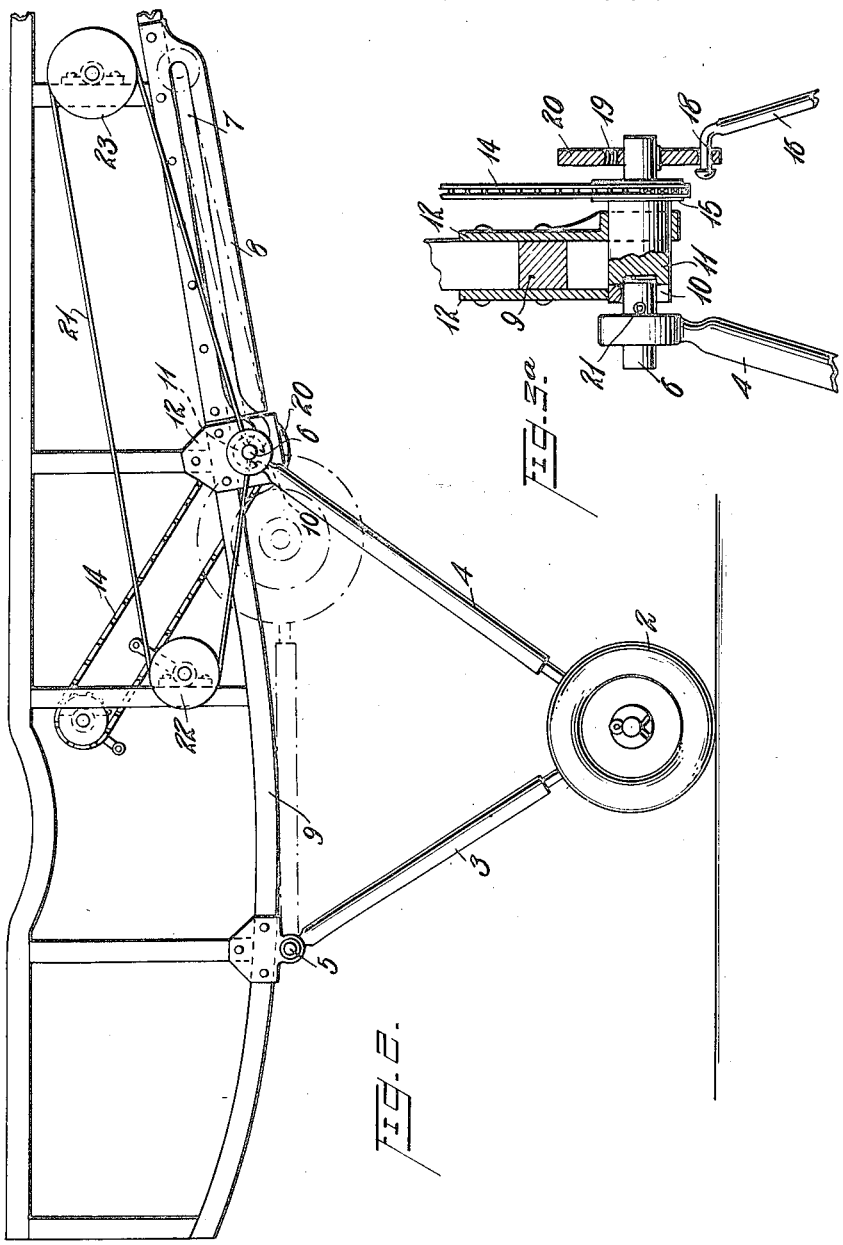

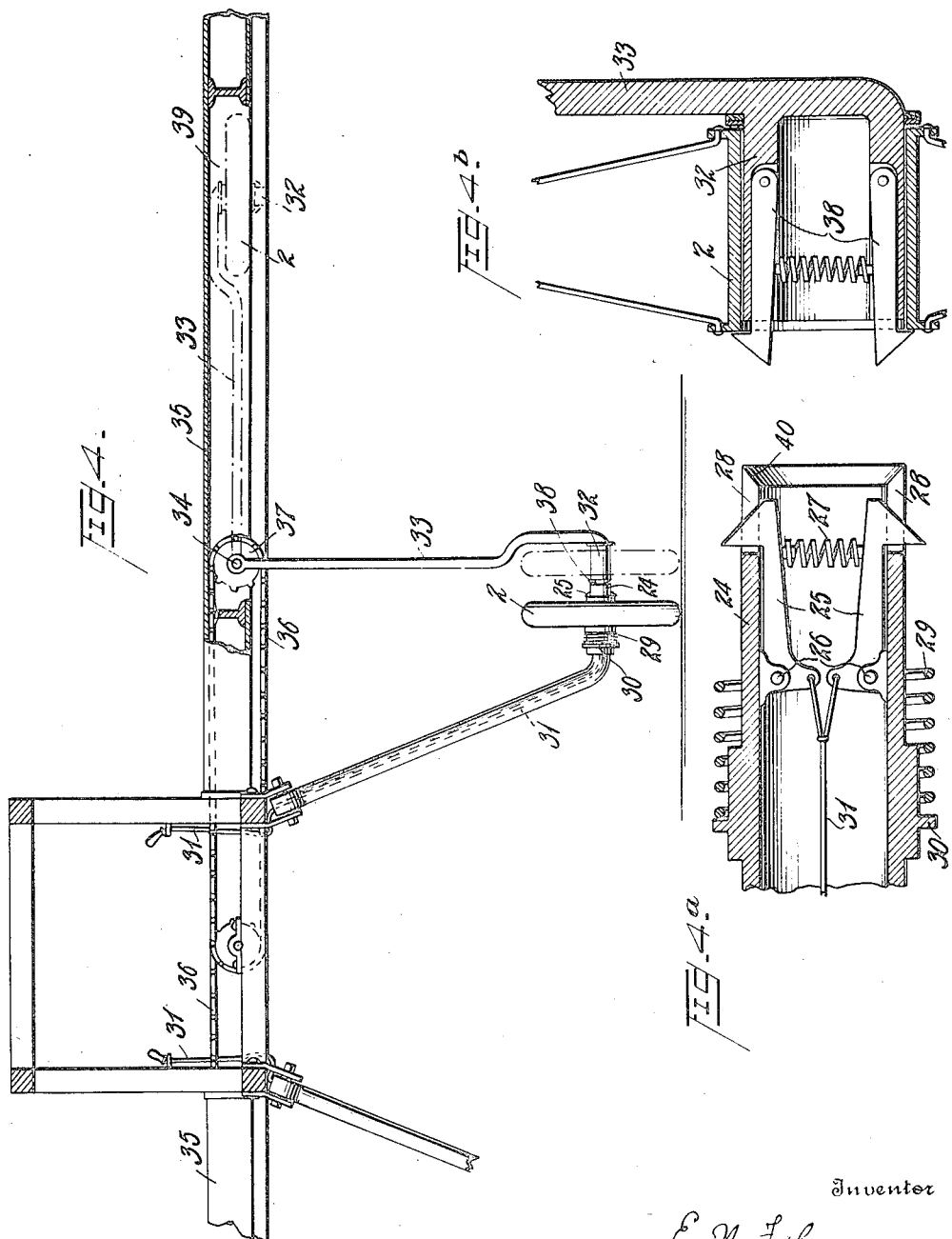

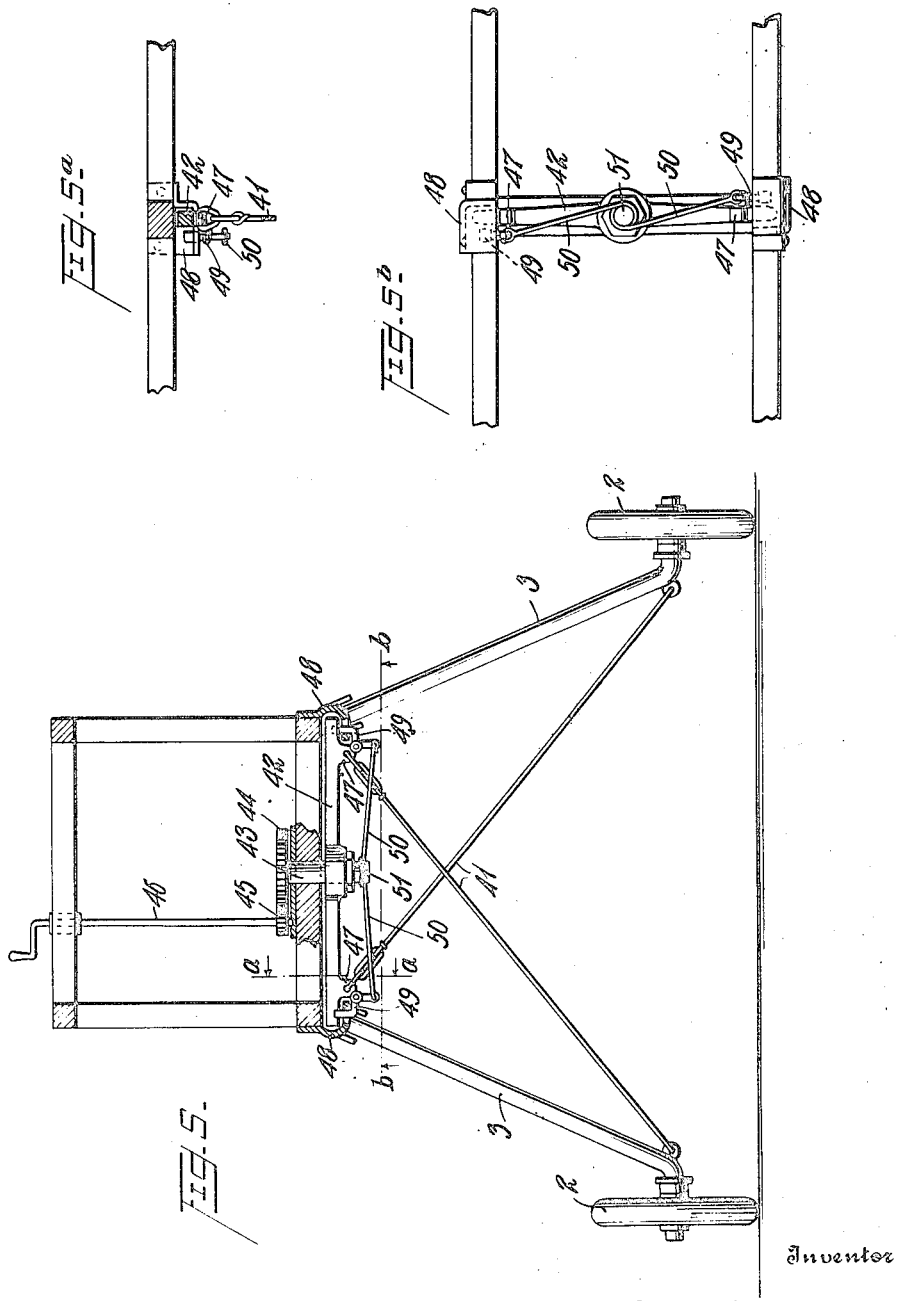

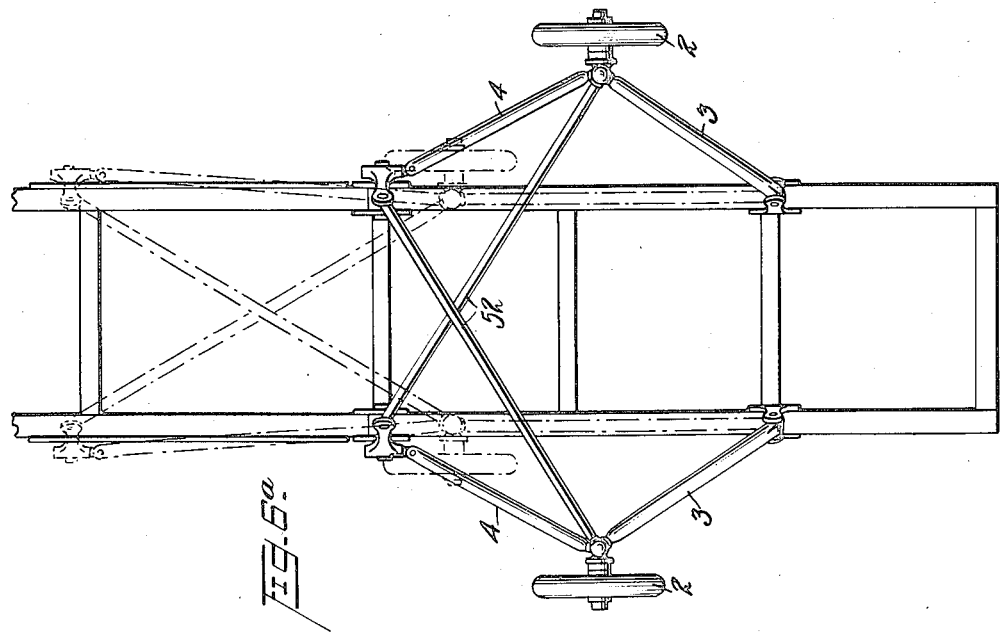
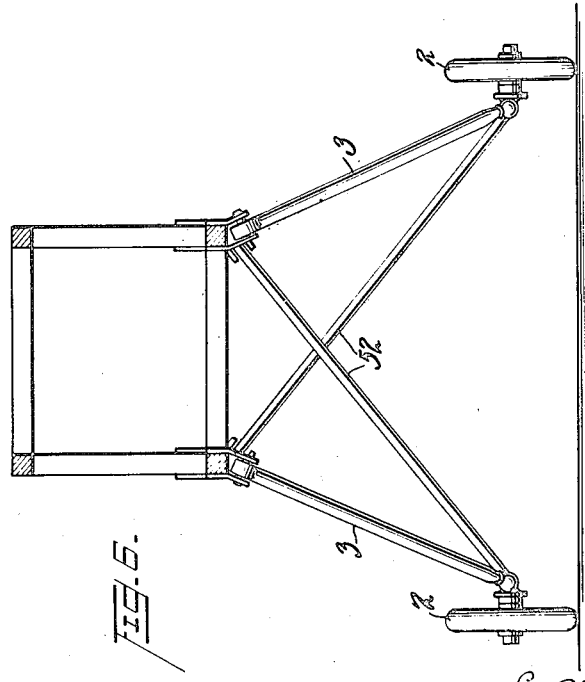

Patented Mar. 4, 1924.

1,485,779

UNITED STATES PATENT OFFICE.

ELISHA N. FALES, OF DAYTON, OHIO.

FOLDING CHASSIS FOR AIRCRAFT.

Application filed March 9, 1922. Serial No. 542,422.

*To all whom it may concern:*

Be it known that I, ELISHA N. FALES, a citizen of the United States, residing at Dayton, in the county of Montgomery and State of Ohio, have invented certain new and useful Improvements in Folding Chassis for Aircraft, of which the following is a specification.

This invention relates to folding chassis for aircraft. In connection with aircraft it is of material advantage to provide in conjunction therewith a folding or collapsible chassis or landing gear in order that when the aircraft is in flight the head resistance, due to the use of the landing gear or chassis, may be reduced to a minimum. This enables the craft to be propelled at much greater speed by the same engine or conversely enables the craft to be propelled at the same speed by throttling the engine or using an engine of less horse power.

The main object of the present invention is to produce a landing gear or chassis which may be folded easily, quickly, and with a minimum amount of physical effort on the part of the aviator after the machine is launched in actual flight and brought to its useful position at any time preparatory to making a landing. In this case the wheels of the chassis are detached from the remainder of the chassis and are moved by simple means into pockets in the wings of the machine. At the same time the remainder of the chassis, including the axle, where one is used, and the frame members, such as legs and stays or truss members, are folded rearwardly until they occupy positions directly under and in contact with the bottom of the fuselage. The invention also contemplates novel means for locking and unlocking portions of the chassis which will enable the frame of the chassis to be folded in the manner above indicated, and again restored to and held rigidly in the useful position.

With the above and other objects in view the invention consists in the novel construction, combination and arrangement hereinafter described, illustrated and claimed.

In the accompanying drawings:

Figure 1 is a front elevation partly broken away in section of an airplane showing the improved chassis in its applied relation thereto;

Figure 2 is a side elevation of the same;

Figure 3 is an enlarged fragmentary detail vertical section showing the means for locking and unlocking the bracing members of the chassis;

Figure 3ª is a section taken at right angles to Figure 3;

Figure 4 is a fragmentary view similar to Fig. 1 showing the means for a manner of handling the wheels of the chassis;

Figure 4ª is an enlarged sectional view of the latching and ejecting means for one of the wheels;

Figure 4ᵇ is a similar view of the latch mechanism carried by one of the wheel transferring members;

Figure 5 is a vertical cross section through the fuselage showing the portion of the chassis and the means for tightening and slackening the tension members of the chassis Figure 5ª is a fragmentary vertical section on the line *a—a* of Fig. 5;

Figure 5ᵇ is a horizontal section on the line *b—b* of Fig. 5 showing the tensioning bar in plan view;

Figure 6 is a view similar to Fig. 1 showing the use of solid struts or braces in lieu of the wire truss members or stays shown in Fig. 1;

Figure 6ª is a bottom plan view of the same.

In one embodiment of the invention, as illustrated in Figs. 1 and 2 the folding chassis or landing gear embodies an axle 1, wheels 2, upwardly converging legs 3, and rearward and upwardly inclined braces 4, all of said parts being preferably of streamline formation to reduce head resistance to a minimum. The legs 3 are shown of the shock absorber type embodying telescopic members, one slidable within the other and containing the usual cushioning means such as springs or elastic bumpers of the usual construction and arrangement. The legs 3 are connected at their upper ends with the fuselage by means of pivots 5 extending transversely and at an inclination to the fuselage so as to enable the legs 3 to swing rearwardly and upwardly as indicated by full and dotted lines in Fig. 2. The connection at 5 is such as to also permit the legs 3 to swing inwardly toward each other at the lower ends as they are swung rearwardly and upwardly. This permits the legs 3 to be folded into parallel relation to the bottom of the fuselage and to the opposite sides thereof.

In order to enable the chassis to be folded rearwardly and upwardly as shown in Fig. 2, each of the braces has at its upper extremity a laterally extending stud 6 which is designed to travel in a fore and aft direction in relation to the fuselage in guideways 7 formed in track members 8 secured to the opposite bottom longérons 9 of the fuselage. In the position shown in Fig. 2, studs 6 occupy sockets 10 in rotatable keepers 11 journaled in brackets 12 secured to the longérons 9. Each of the keepers 11 is formed with a lateral slot 13 which intersects the socket 10 as indicated in Figs. 3 and 3ª so that by turning the keeper 11, the studs 6 may be either locked in position shown in full lines in Fig. 2, or released from the socket 10 so as to pass through the slot 11 and enter and traverse the guideways 7 above referred to. The keeper 11 may be rotated by means of a sprocket chain 14 extending around a sprocket wheel 15 on the rotatable keeper 11 and upwardly over another sprocket wheel controlled by suitable manual means and arranged in or adjacent to the fuselage.

In conjunction with the frame of the fuselage I also employ a locking strut 16 which is attached by means of a pivot to the central joint of the axle 1, the latter, in one embodiment of the invention, consisting of a pair of toggle members which are pivotally connected at their opposite ends to the legs 3 and connected together centrally by means of a pivot 17, the joint at 17 being so shouldered that it may break in an upward direction as shown in Fig. 1 while it is not permitted to break in a downward direction. The locking strut 16 is provided with a laterally extending stud or pin 18 which is received in a cam slot 19 in a cam or disk 20 fast on the inner end of one of the rotatable keepers 11. In the initial part of the folding operation, the locking strut 16 is drawn upwardly by means of the cam 20, thereby breaking the joint 17 in an upward direction and this action continues during the remainder of the folding operation of the chassis so that the lower ends of the legs 3 are drawn inwardly until the legs 3 are substantially parallel to each other and parallel and close to the bottom longérons 9 of the fuselage.

The means for moving the upper ends of the braces 4 rearwardly and forwardly may consist of a flexible cable 21 passing around a manually controlled drum or wheel 22 in the fuselage and also around an idler 23 arranged rearwardly thereof, two of such cables 21 being employed and being connected to the studs 6 in any convenient way. Other means may, however, be devised for effecting the back and forth movements of the studs 6 without departing from the principle of the invention.

Referring now more particularly to Figs. 4, 4ª and 4ᵇ it will be observed that each of the wheels 2 is mounted on a short tubular stub shaft or axle extension 24 shown in detail in Fig. 4ª, said stub axle being suitably shouldered to form an abutment seat 70 for the wheel 2. Normally the wheel 2 is held on the stub axle 24 by means of spring pressed wheel retaining latches 25 pivotally mounted at 26 within the stub axle, 27 designating the spring for forcing the engaging point of the latches through slots 28 in the stub axle 24. The wheel is normally held between the engaging points of the latches and the wheel ejecting helical spring 29 which bears against an annular shoulder 30 on the stub axle 24. The latches 25 are forced inwardly by means of a pull cord or cable 31 extending to a point within reach of the aviator. It will now be understood that when the latch 25 is retracted the wheel is ejected from the stub axle by the action of the ejector spring 29. The wheel 2 upon leaving the stub axle 24 is received by and upon a similar tubular stub axle 32 extending inwardly from the lower end of a transferring arm 33 which is pivotally swung at 34 on one of the wings 35 of the airplane at one side of the fuselage, the arm 33 being controlled in any suitable way, as for example by means of a sprocket chain 36 passing around a sprocket wheel 37 fast on the pivot of the arm 33 as indicated in Fig. 4. The chain 36 may extend into the fuselage and as two of such chains will ordinarily be used they will pass around the same sprocket wheel in the fuselage so as to be simultaneously controlled by a single hand operated means. The wheel 2 is temporarily retained on the receiving stub axle 32 by means pivoted and spring pressed latches 38 similar in all respects to the latches 25 used in conjunction with the stub axle 24. Each arm 33 in swinging upwardly carries the respective wheel 2 into a housing recess 39 in the adjacent wing where it is shielded against air pressure, and all head resistance of said wheel eliminated. In the return or downward movement of the wheel 2, the bevelled ends of the latches 38 come in contact with bevelled surfaces 40 of the stub axle 24 and the inertia of the wheel 2 in the direction of the stub axle 24 causes said wheel to slide off the stub axle 32 upon the stub axle 24 where it compresses the spring 29 and is caught and held by the spring latches 25. Before the wheels 2 are returned to their useful positions on the stub axles 24 it is of course necessary to lower the remainder of the chassis so that the stub axles 24 will be in proper position to receive the wheels.

Where truss wires 41 are employed as tension members, as shown in Fig. 5, the same may be tensioned or relaxed by means of a tensioning bar 42 which is capable of rotative movement around its center, said bar 42 being fast on a rotatable shaft 43 having thereon a gear 44 with which meshes a pinion 45 on a manually operable rotary shaft 46 within or adjacent to the fuselage as shown in Fig. 5. The tension members 41 are shown as fastened to legs 47 on the bottom of the tensioning bar 42. When the bar 42 is in the position shown in Fig. 5, the tension members 41 are taut, but when a partial or quarter rotation is imparted to the bar 42 the tension members 41 are slack so as to permit the folding operation of the chassis. The opposite ends of the tensioning bar 42 are ordinarily received in keepers 48 fastened to the bottom longerons of the fuselage and formed with slots to receive spring pressed latches 49 of elbow shape having operating connections 50 which extend inwardly around and are adapted to be wrapped upon an extension 51 of the shaft 42. In this way the tensioning bar 42 is locked against accidental movement but may be unlocked to permit a partial rotative movement thereof in order to relax the tensioning members 41. Other means may be employed to tension and relax the members 41. In lieu of using truss wires as tensioning members solid streamline trusses 52 may be used, as shown in Figs. 6 and 6ª. In this case members 52 will have a partial universal connection at their opposite ends with the members to which they are attached, such for example as a ball and socket joint. This is necessary in order to enable the legs 3 and the braces 4 to move inwardly at their lower ends simultaneously with the upward and rearward folding movement thereof, as indicated in Fig. 6ª.

What I claim is:

1. In aircraft, the combination of a fuselage, wings extending therefrom and having pockets in the underside thereof, a chassis embodying frame members, wheels normally journaled thereon but detachable therefrom, and means operable while the aircraft is in flight for transferring said wheels from the chassis frame into said pockets in the wings, said frame members being retractable longitudinally of said aircraft.

2. In aircraft, the combination of a fuselage, wings extending therefrom and having pockets in the underside thereof, a chassis embodying frame members, wheels normally journaled thereon but detachable therefrom, and means operable while the aircraft is in flight for transferring said wheels from the chassis frame into said pockets in the wings and restoring said wheels to their useful positions.

3. In aircraft, the combination of a fuselage, wings extending therefrom and having pockets in the underside thereof, a chassis embodying frame members, wheels normally journaled thereon but detachable therefrom, means operable while the aircraft is in flight for transferring said wheels from the chassis frame into said pockets in the wings and restoring said wheels to their useful positions, said means comprising pivotally mounted wheel-transferring arms, operating means for said arms, and means for effecting the removal of said wheels from the chassis frame members to the transferring arms and vice versa.

4. In aircraft, the combination of a fuselage, wings extending therefrom and having pockets in the underside thereof, a chassis embodying frame members, wheels normally journaled thereon but detachable therefrom, means operable while the aircraft is in flight for transferring said wheels from the chassis frame into said pockets in the wings and restoring said wheels to their useful positions, the chassis frame members being foldable against the fuselage.

5. In aircraft, the combination of a fuselage, wings extending therefrom and having pockets in the underside thereof, a chassis embodying frame members, wheels normally journaled thereon but detachable therefrom, means operable while the aircraft is in flight for transferring said wheels from the chassis frame into said pockets in the wings and restoring said wheels to their useful positions, said means comprising pivotally mounted wheel-transferring arms, operating means for said arms, means for effecting the removal of said wheels from the chassis frame members to the transferring arms and vice versa, the last named means including wheel-holding latches, tripping means for said latches, and wheel-ejecting means.

6. In aircraft, the combination with the fuselage, of a folding chassis embodying legs having pivotal connection with the fuselage, wheels detachably journaled at the lower ends of said legs, means for detaching and restoring, at will, the wheels to said legs, braces having jointed connection at their lower ends with said legs and having slidable connection at their upper ends with the fuselage, and means for sliding said upper ends of the braces along the fuselage.

7. In aircraft, the combination with the fuselage, of a folding chassis embodying legs having pivotal connection with the fuselage, wheels detachably journaled at the lower ends of said legs, means for detaching and restoring, at will, the wheels to said legs, braces having jointed connection at their lower ends with said legs, and having slidable connection at their upper ends with the fuselage, means for sliding said upper ends of the braces along the fuselage and means for locking and releasing said slidable brace ends.

8. In aircraft, the combination with the fuselage, of a folding chassis embodying legs having pivotal connection with the fuselage, wheels detachably journaled at the lower ends of said legs, means for detaching and restoring, at will, the wheels to said legs, braces having jointed connection at their lower ends with said legs and having slidable connection at their upper ends with the fuselage, means for sliding said upper ends of the braces along the fuselage, truss members for said legs, and means for tensioning said truss members.

9. In aircraft, the combination with the fuselage, of a folding chassis embodying legs having pivotal connection with the fuselage, wheels journaled at the lower ends of said legs, braces having jointed connection at their lower ends with said legs and having slidable connection at their upper ends with the fuselage, and means for sliding said upper ends of the braces along the fuselage, and an axle extending between said wheels and composed of toggle members jointed together to break upwardly.

10. In aircraft, the combination with the fuselage, of a folding chassis embodying legs having pivotal connection with the fuselage, wheels journaled at the lower ends of said legs, braces having jointed connection at their lower ends with said legs and having slidable connection at their upper ends with the fuselage, means for sliding said upper ends of the braces along the fuselage, an axle extending between said wheels and composed of toggle members joined together to break upwardly and means for exerting an upward or a downward stress on said break joint.

11. In aircraft, the combination with the fuselage, of a folding chassis embodying legs having pivotal connection with the fuselage, wheels journaled at the lower ends of said legs, braces having jointed connection at their lower ends with said legs and having slidable connection at their upper ends with the fuselage, means for sliding said upper ends of the braces along the fuselage, an axle extending between said wheels and composed of toggle members jointed together to break upwardly, and means for exerting an upward or a downward stress on said break joint and also locking said joint when the axle members are in normal position.

In testimony whereof I affix my signature.

ELISHA N. FALES.